(12) United States Patent
Holt et al.

(10) Patent No.: US 7,261,062 B2
(45) Date of Patent: Aug. 28, 2007

(54) WATER FUEL CONVERTOR

(76) Inventors: Cecil G. Holt, 988 Sugar Hill Rd., Brookneal, VA (US) 24528; Toby D. Baker, 988 Sugar Hill Rd., Brookneal, VA (US) 24528; John Leland Speight, 108 Britf Pl., Forest, VA (US) 24551; Iboynne M. Anderson, 673 Rangewood Dr., Evington, VA (US) 24550; Jeff Salmon, 801 Princess Ann Rd., Virginia Beach, VA (US) 23457; David Stevens, 3404 Elk-Valley Rd., Forest, VA (US) 24551

( * ) Notice: Subject to any disclaimer, the term of this patent is extended or adjusted under 35 U.S.C. 154(b) by 0 days.

(21) Appl. No.: 11/181,912

(22) Filed: Jul. 15, 2005

(65) Prior Publication Data

US 2007/0012264 A1    Jan. 18, 2007

(51) Int. Cl.
*F02B 47/02* (2006.01)
(52) U.S. Cl. .................................. 123/1 A; 123/25 R
(58) Field of Classification Search ............... 123/1 A, 123/3, 25 R, 25 E
See application file for complete search history.

(56) References Cited

U.S. PATENT DOCUMENTS 3,818,875 A * 6/1974 Phillips et al. ............ 123/25 E
4,271,793 A * 6/1981 Valdespino ................... 123/3
5,540,190 A * 7/1996 Rogers et al. ............. 123/1 A
6,866,756 B2 * 3/2005 Klein ......................... 204/268
6,912,977 B2 * 7/2005 Cumming ..................... 123/3

* cited by examiner

*Primary Examiner*—Stephen K. Cronin
*Assistant Examiner*—Jason Benton

(57) ABSTRACT

Process to use water, methyl alcohol, and baking soda to make hydrogen and oxygen to increase fuel mileage on gasoline, diesel and LP gas engines using the process generally known as "Electrolysis" with many modifications. A device and method for producing hydrogen and oxygen gases from Water Solutions and simultaneously using the gases produced to supplement fuels used to operate the vehicle or engine. The solution used in the Electrolytic container is water and sodium bicarbonate. The hydrogen and oxygen—producing device is powered by as many as 5,500 amperes, generator or alternator, using the vehicle engine alternator or generator to produce the current to power the electrolytic cell. The electrolytic container is kept at a constant solution level. The water solution temperature may be controlled by either a low-pressure air conditioning line, a water-cooling line with a thermostatic control valve, on-off temperature control switch or water-cooling fins. The electrolytic cell is equipped with means to control the energy load, water level, gas flow and presenting the hydrogen and oxygen into the combustion chamber of the vehicle and or the engine.

5 Claims, 6 Drawing Sheets

24 V ALTERNATOR

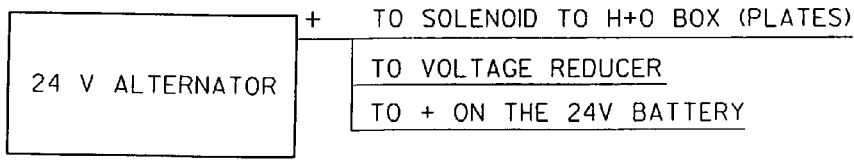
FIG. 1 - 24 V ALTERNATOR
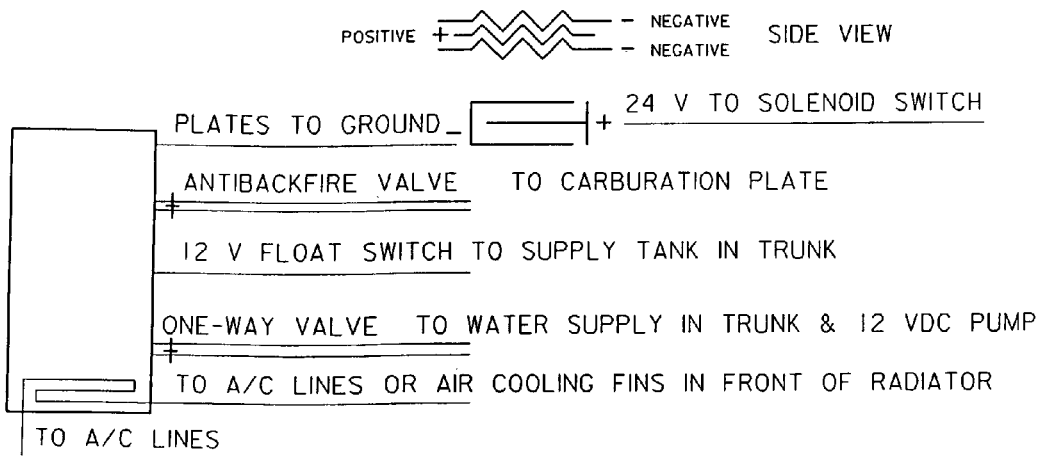
FIG. 2 - HYDROGEN AND OXYGEN-PRODUCING BOX
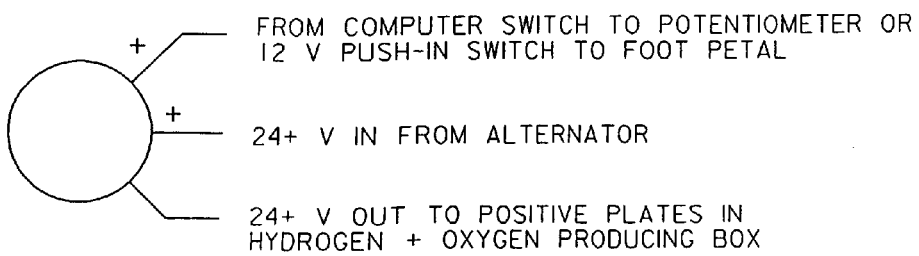
FIG. 3 - SOLENOID SWITCH

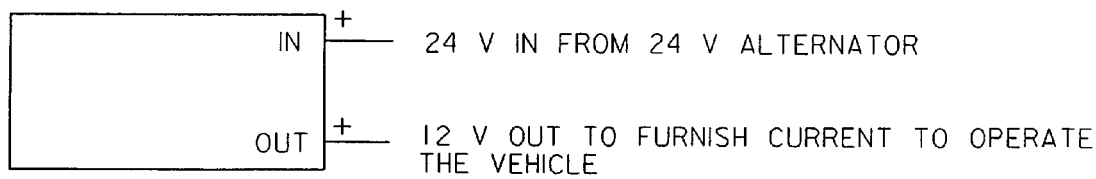
FIG. 4 - VOLTAGE REDUCER
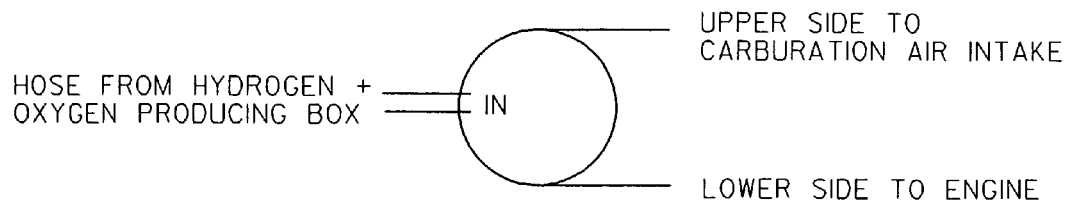
FIG. 5 - CARBURATION SYSTEM ADAPTER
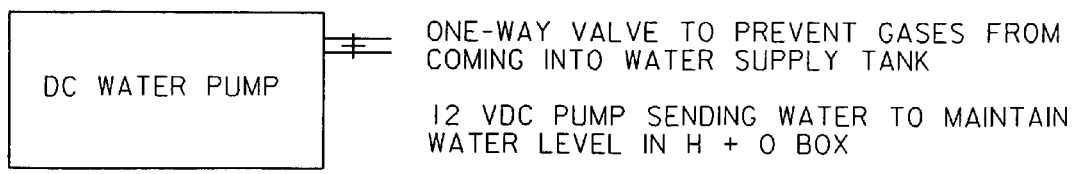
FIG. 6 - WATER CONTAINER BOX

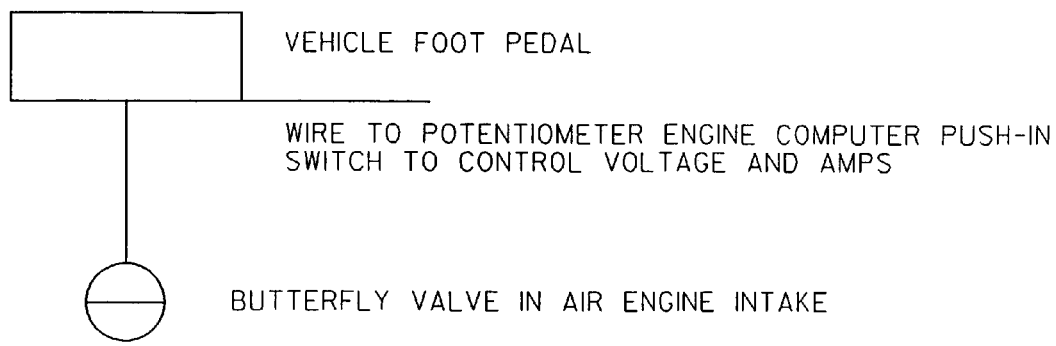
FIG. 7 - CURRENT CONTROLLER
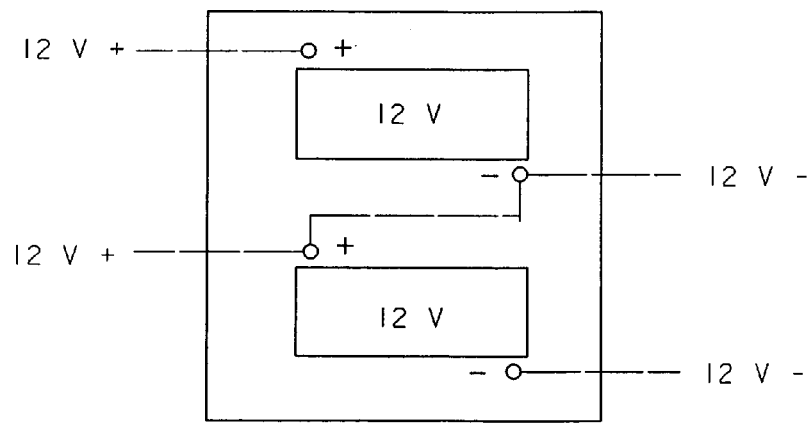
FIG. 8 - BATTERY BOX

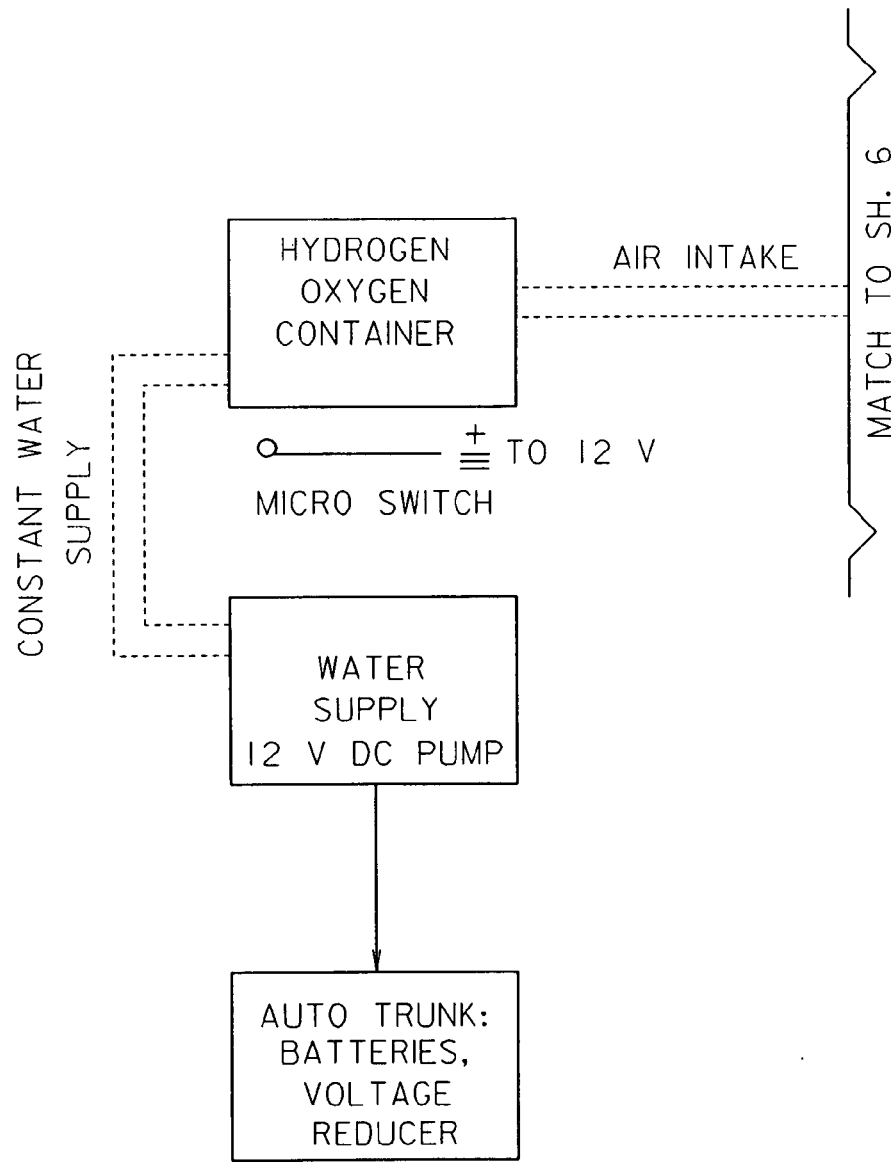
FIG. 10A – COMPLETE SCHEMATIC

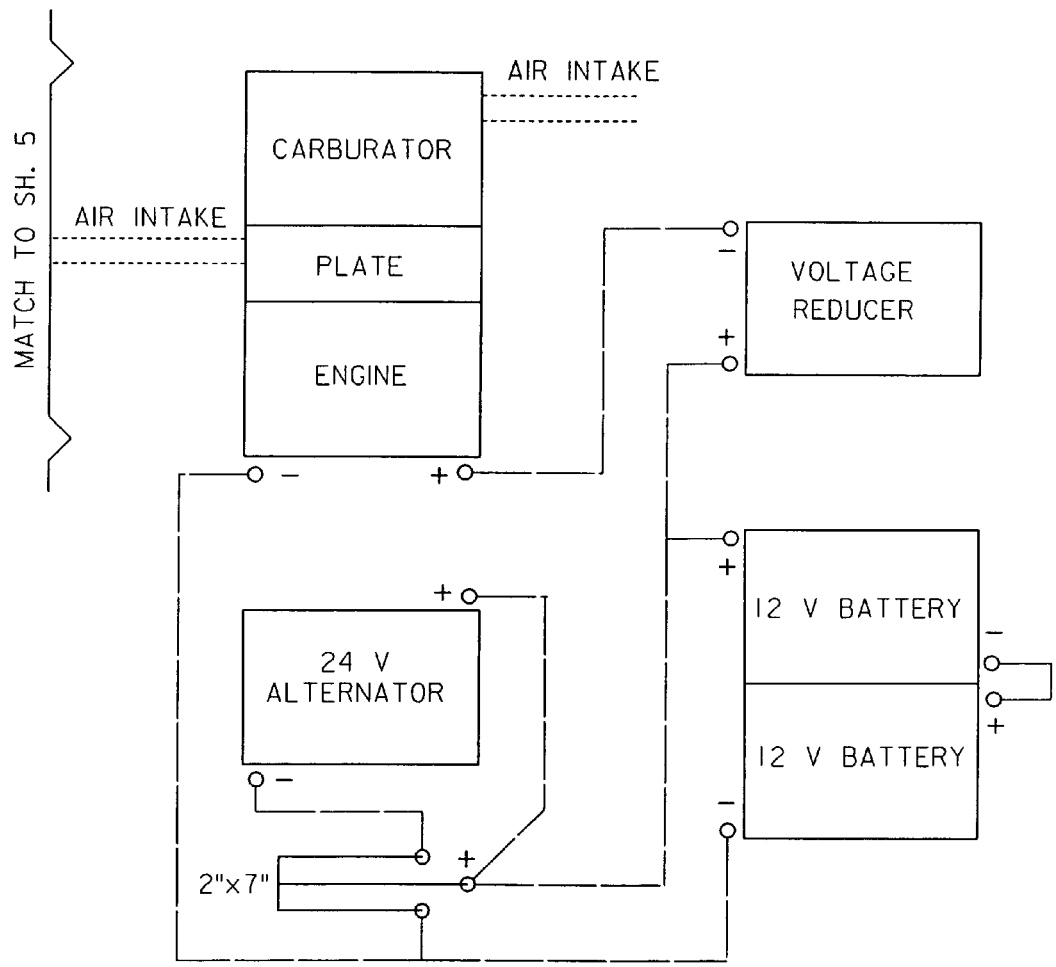
FIG. 10B - COMPLETE SCHEMATIC

WATER FUEL CONVERTOR

REFERENCES CITED

| U.S. Patent Documents | | |
|---|---|---|
| 3648668 | March, 1972 | Pacheco |
| 4099489 | July, 1978 | Bradley |
| 4271793 | June 1981 | Valdespino |
| 4363610 | August 1988 | Bidwell |
| 5105773 | April 1992 | Cunningham et al. |
| 5119768 | June 1992 | Russell |
| 5143025 | September 1992 | Monday |
| 5156114 | October 1992 | Gunnerman |
| 5231954 | August 1993 | Stowe |

BACKGROUND OF THE INVENTION

The state of the current art of producing hydrogen gaseous fuels to use with the fossil fuels that will greatly increase your present fuel mileage has mainly been by nuclear reactors, electrolysis that uses more current than the value of the hydrogen gases that are produced. It is not financially practical to build hydrogen-refueling stations in the country using the present state of the current art methods to produce hydrogen to alleviate the current oil crisis. Shortcomings that are present: The gaseous fuel introduction being overly complicated, heavy fuel containers, expensive metal hydrides, not having practical and economical sources of gaseous fuel available to use in combination with or to replace fossil fuel, not being able to produce a sufficient volume of gaseous fuel from water using D.C. current to power the electrolytic container while operating the vehicle. U.S. Pat. No. 5,513,600 has several problems. Being the way the fuel is entered into the piston combustion chamber. The gases were put in with the gasoline fuel into the injectors. It is found to be beneficial to use the vacuum created by the pistons to pull the extra fuel, gases, into the engine, leaving the present carburetion system intact. The Butterfly valve in the manifold air intake governs the amount of extra fuel pulled in to supplement the amount of fuel from the present carburetion system. This method increases the fuel mileage and also gives a tremendous power increase. The U.S. Pat. No. 5,513,600 [Teves invention] was made to operate a Wisconsin engine under no load, other than the Generator or Alternator, for only 12 minutes and the engine cut off.

Some patents using hydrogen fuel had many faults that were not appreciated by the vehicle owners. Several used heavy steel containers to hold the hydrogen gas (U.S. Pat. Nos. 4,508,084; 3,983,882). Others did not produce enough hydrogen to make an appreciable difference in performance and increase the fuel mileage. (U.S. Pat. No. 4,203,814; and U.S. Pat. No. 4,368,696; and U.S. Pat. No. 3,458,412). Another invention U.S. Pat. No. 4,036,181 uses metal hydrides which are very expensive, complicated, takes a great amount of time and equipment. Another invention (U.S. Pat. No. 4,763,610) uses a gas generator using sodium hydroxide—which is very expensive when used to produce large volumes of hydrogen gases. There is a noticeable increase in pollutants. Not many of these inventions produce enough hydrogen gas to make a very sizeable increase in the fuel mileage. They were not very acceptable to the average general public. The hybrid hydrogen-gasoline electric cars on the markets are not very well accepted by the public for many reasons. Almost all of them have to purchase their hydrogen, which does not last for many miles, and there is very little hope that the hydrogen will become readily available and inexpensive at many places in the country and world. This invention uses water, baking soda, and methyl alcohol to keep the water from freezing, all of which are inexpensive and available. This invention will be available to be installed on any vehicle, new or old, at an inexpensive cost.

SUMMARY

It is an object of the invention to provide a gaseous fuel to the combustion chamber using the existing carburetion system. This fuel is to be provided from an inexpensive source, such as water and other items that are readily available. The changes to be made to your present vehicle, or additions and changes in the manufacturing process are also to be inexpensive. It is an object of the invention to provide a hydrogen gas without heavy fuel canisters or expensive cracking agents. It is an object of the invention to produce a sufficient volume of hydrogen gaseous fuel mixture that will make a high percentage increase in the fossil fuel mileage of the vehicle.

This invention provides a method to convert a water solution containing baking soda and methanol alcohol, to prevent freezing, to produce hydrogen and oxygen gases that provides up to 1,000% percent increase in fuel mileage. This method actually works on all combustible engines, old and new.

BRIEF DESCRIPTION

FIG. 1 is a view of the engine alternator or generator.

FIG. 2 is a view of the hydrogen and oxygen-producing box which contains the stainless steel plates, the water cooling device.

FIG. 3 is a view of the solenoid switch to send current to the electrolytic container.

FIG. 4 is a view of the voltage reducer to reduce the 24,36 or 48 volts back to 12 volts to operate the engine.

FIG. 5 is a view of the carburetion system adapter to carry the gaseous fuel to the airflow passageway into the engine.

FIG. 6 is a view of the water container box to store the electrolyte solution.

FIG. 7 is a view of the current controller which may be a potentiometer, or a Computer.

Figure 9:
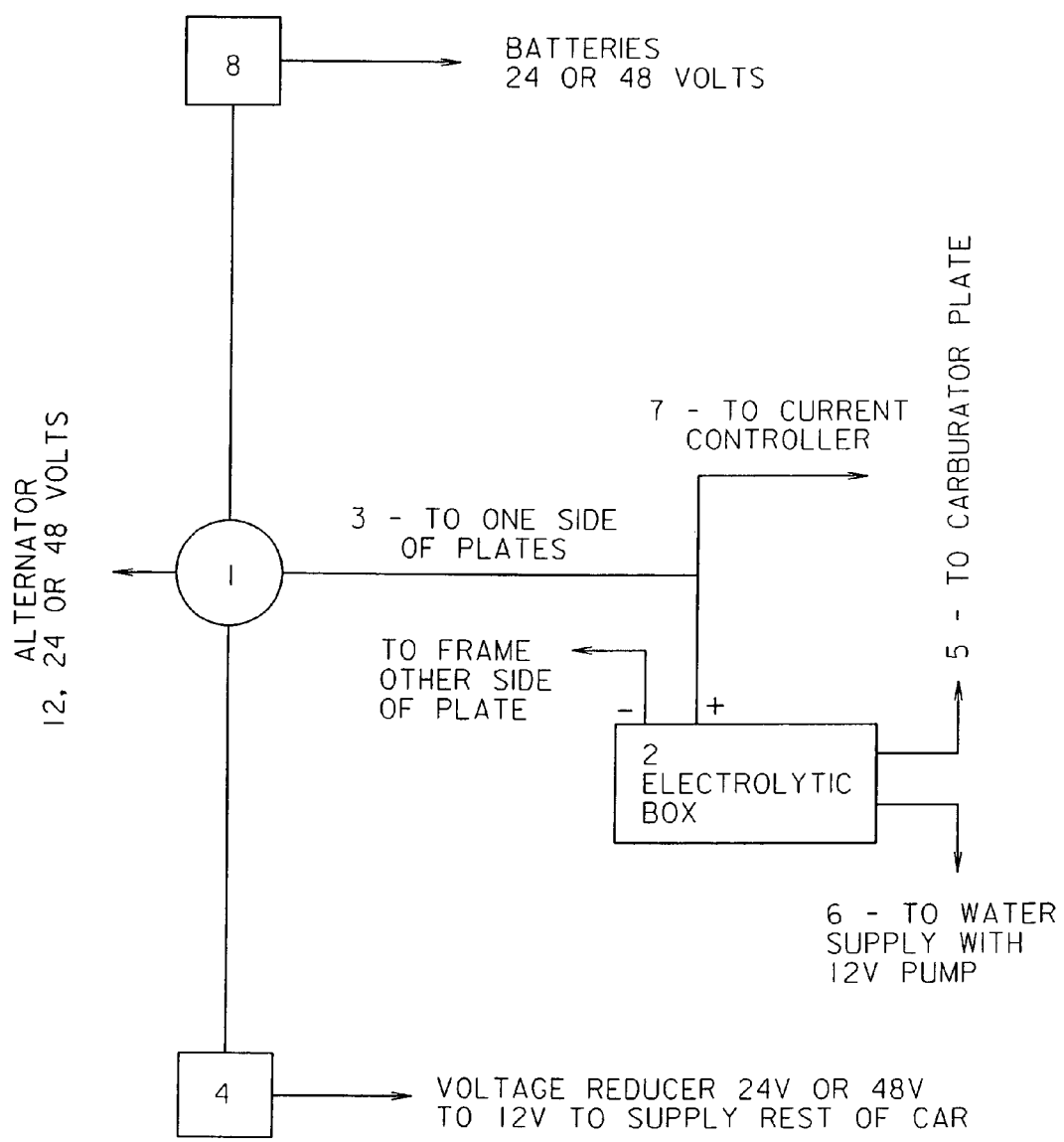

FIG. 8 is a view of the battery box in the trunk or any other available space. The electrolyte solution is stored in the water tank. (6) The pump in the water tank is activated and keeps the solution at a constant level by the micro float switch in the electrolytic chamber. (2) Power from the batteries and the high amp alternator (1) supply current to the plates in the electrolytic chamber (2) that produce the hydrogen and oxygen gases that are pulled into (5) the throttle body chamber with the volume of air that is pulled into the combustion chamber. The gases produced from the electrolyte solution (2) provide a majority of the fuel to operate the vehicle that this invention is installed on. Then the current is (7, 4) reduced to 12 volts to operate to vehicle.

DESCRIPTION OF INVENTION

Process to use water, methyl alcohol and baking soda to make hydrogen and oxygen to increase fuel mileage on gasoline, diesel and LP gas engines, using the process generally known as electrolysis with many modifications. [The baking soda and methyl alcohol are inexpensive and readily available.]

Build a 'stack' of plates [3, 5, or 7] or as many as necessary to produce the amount of fuel, hydrogen and oxygen gases, needed to run and or supplement the gasoline mileage by as much as 25%, up to 1,000% percent or any variation in between.

The plates being made of perforated stainless steel or any different metal that will not oxidize or react negatively when using the electrolyte solution mentioned above, as the $1^{st}$, $3^{rd}$, $5^{th}$, etc in this manner. The anode plates may be made of any non-oxidizing, conductive metal that will not contaminate the solution or plates to control the temperature. The plates may have different size perforated holes from 0.0125 to 0.125 inches and different thickness that can range from 0.003 to 0.125 inches. The plates may be corrugated with the bending ranging from 5 to 90 or more degree angles. The plates may be curved, rounded or straight and 1 inch to 5 and a half inches wide and 3 to 11 inches long, more or less. The plates are placed in stationary positions of $1/32^{nd}$ to $1/2$ inch separation. The cathode plates being the $1^{st}$, $3^{rd}$, $5^{th}$ etc and the anode plates being the $2^{nd}$, $4^{th}$, $6^{th}$, etc the positive and negative plates. A non-conductive material is used between the plates as separation spacers. Two or more cells in combination may be used in the electrolytic container. The negative plates produce hydrogen and the positive plates produce oxygen. The hydrogen and oxygen are not stored separately. The hydrogen and oxygen gas produced is the fuel used to supplement the gasoline or other fuels to power the engine. The hydrogen and oxygen gases are delivered to the engine by means of engine vacuum or pressure produced in the electrolysis chamber into an induction plate under the carburation system, or in front of the carburetion system, used by each different engine. On the fuel injected and other engines the gases may be presented into the air passageway either before or behind the mass air-flow sensor or into the fuel injectors. This induction plate mentioned is made of the same shape as the bottom of the carburetor air intake or may by made of aluminum or any similar type metal, or the same metal as the carburetor air intake. It has the same thickness walls as the carburetor, or thicker on one side to accommodate the $1/8^{th}$ to $1/2$ inch air intake to bring the hydrogen and oxygen in. The thickness may be up to $1/2$ inch or more depending on the space available. The bolt pattern to bolt down may be the same as the air intake from the carburetor system on the car. Use extra length bolts to bolt the plate to the engine air intake. Vacuum created by the pistons pull the gases into the air intake manifold on the engine. Using the gasoline foot pedal to regulate the amount of air and fuel pulled in by the butterfly valve in the air intake. This regulates the amount of fuel needed to run the engine. Also the gasoline foot pedal may regulate the volume of current to produce the necessary hydrogen and oxygen to increase fuel mileage by using a computer or potentiometer to regulate the amount of current needed. The vacuum created by the pistons pulls the gases in, permitting them to mix together with the gasoline from the carburetor or fuel injection system or any carburetion system used by each vehicle. This method will work on all engines from the first made to the newest engines being made, as long as the throttle body assembly method is used. Fuel injected engines admit the air, hydrogen and oxygen gases into the manifold air intake system using the gas foot pedal to regulate the amount of hydrogen and oxygen to supplement the gasoline to the fuel injectors or the carburetion system needed to run the engine. The foot pedal, to start producing hydrogen and oxygen, after the engine is started, activates a switch. The hydrogen and oxygen is not produced until after the engine has been started and is idling.

The power [DC or AC] alternator or generator produces the hydrogen and oxygen gases from water, [distilled water may be preferred; however, no problems have been noted from the use of other water sources] and baking soda [baking soda is also a cleaning agent] or a similar product allowing current to flow with less resistance, is produced from a larger capacity alternator or generator on the engine. This being a 12 to 48 volt or more, 50 to 5,500 amperes DC or AC alternator or generator to produce necessary current to run the engine and produce the gases to supplement the gasoline or other fuel to increase the gas mileage up to 1000 percent. After the current has completed its cycle to power the electrolytic container from to 12 to 48 volts, or whatever the volts used on each vehicle, it is then reduced back to the voltage necessary to run the vehicle using a voltage reducer, or other methods, completing the battery recharging cycle. These higher volt—amp DC or AC alternators or generators and voltage reducers are readily available now on the open market.

This method of producing hydrogen and oxygen, from the electrolyte solution mentioned, using alternator or generator power from the vehicle being driven has increased gas mileage from 25 percent to 1,000 percent when driving the car on the highway for many hundreds and thousands of miles with no negative action to the working ability of the engine or vehicle in any way.

The container used to house the hydrogen-oxygen produced is made of polycarbonate or any similar material that will not react negatively with the hydrogen and oxygen gases or the metals on or in the engine or the car. The container is glued, welded or molded and or screwed together, using rubber gaskets. The chosen glue must not react negatively with the water solution and the hydrogen and oxygen or epoxy. The container may be molded into the correct size to fit in the necessary space on the vehicle. The container will house or store the negative and positive charged plates that produce up to 10,000 volts of DC or AC current and 50 to 5,000 amps and up to 10,000 degree fahrenheit heat necessary to turn the electrolyte solution into hydrogen—oxygen gases. A small water circulation system to maintain the right water temperature inside the electrolytic container, low-pressure air-conditioning line from the vehicle air conditioning system or other cooling methods. A refilling float attached to a micro switch that does not oxidize, a small DC or AC pump and switches to maintain the water level inside the electrolytic container. A storage supply of the electrolyte solution is stored inside the trunk of the vehicle, or any other available space. This mixture is a T-spoon to 4 big tablespoons full of baking soda to a gallon of water. Methyl alcohol is used in an according percentage to a gallon of water, preventing the water from freezing.

A hose is attached to the electrolytic container allowing the gasses to flow into the carburetor induction plate. All the hydrogen and oxygen produced is used, preventing a build-up of gases in the electrolytic container. There is a small vacuum created by the engine air intake. A one-way valve is installed in the hose going from the water supply tank. An anti-backfire device in the hydrogen-oxygen container hose connected to the induction plate that delivers the fuel into the airflow passageway.

The current regulator to control volts and amps to produce hydrogen and oxygen is used, the regulator may be comprised of a computer attached to the gas foot pedal or the main automobile computer, a potencheometer may also be used. A push—in switch (DC current) attached to the gasoline foot pedal or the throttle rod may be used.

The invention claimed is:

1. An apparatus for producing and supplying hydrogen and oxygen gases to an internal combustion engine for the purpose of increasing fuel mileage;

The apparatus is comprised of:

An electrolysis chamber having one or more stainless steel metal plates that are connected to the anode and cathode power source that is completely immersed in the electrolyte solution; The electrolyte solution is composed of baking soda and water; the baking soda, in addition to its electrolyte properties, is used as a cleaning agent for the stainless steel plates; The stainless steel perforated plates in the electrolysis chamber having a specially designed shape and bending to control the solution temperature while allowing the high amperage and voltage to produce the volume of hydrogen and oxygen gases that increase the fuel mileage on the engine or vehicle; A power source having a 12, 24, 36 or 48 volt alternator and batteries, the voltage being variable based on engine operating parameters;

Wherein the bending of the anode and cathode stainless steel plates is as described, a 5 degree to a 90 degree angle bend, followed by about 1 inch to 2 or more inches of straight metal to another similar bend, followed by as many repetitions as allowable for the space available in the electrolysis chamber; each individual plate is separated by a spacing of about $1/16^{th}$ inch, to $3/8^{th}$ inch, and held permanently together by plastic strips and plastic spacers; the negatively charge cathode is connected to the cathode plates, the positive charged wire is connected to the anode plates, the cathode and anode plates being alternating in position and totally submerged in the electrolyte solution.

2. An apparatus as claimed in claim 1 further comprising;

The anode plates of claim 1 are connected to the positive wire from the alternator to the electrical switch that starts producing hydrogen and oxygen gases, after the engine is started, the cathode plates of claim 1 are connected to the negative connection on the battery.

3. The apparatus of claim 2 further comprising;

A plate being the same shape as the carburetion system of the engine that the invention is installed on has a hose connected to it admitting the hydrogen and oxygen gases from the electrolysis chamber into the fuel airflow passageway, into the combustion chamber of the engine.

4. The apparatus of claim 3 further comprising;

When the throttle plate assembly method is used, even in conjunction with fuel injection, in the airflow passageway, governs as directed from the gas foot pedal, the volume of air, fuel, hydrogen and oxygen that is admitted into the combustion chamber of the engine.

5. The apparatus of claim 4 further comprising:

When the higher voltage and amperage newly manufactured alternators of claim 1 are used, operating more efficiently, experience negligible engine power loss.

* * * * *